Patented Jan. 18, 1949

2,459,139

UNITED STATES PATENT OFFICE 2,459,139

PROCESS FOR EXTRACTION AND PURIFICATION OF SUBTILIN

Keene P. Dimick, Redwood City, Gordon Alderton, Albany, and James C. Lewis, Berkeley, Calif., and Howard D. Lightbody and Harry L. Fevold, Chicago, Ill., assignors to the United States of America as represented by the Secretary of Agriculture No Drawing. Application September 26, 1947, Serial No. 776,396

5 Claims. (Cl. 260—236.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the purification of subtilin, an antibiotic substance produced by a particular strain of *Bacillus subtilis*.

The preparation of subtilin and some of its properties are described by E. F. Jansen and D. J. Hirschmann (Arch. Biachem., vol. 4, p. 297, 1944). The asparagus juice medium (H. Humfeld and I. C. Feustel, Proc. Soc. Expt. Biol. and Med., vol. 54, p. 232, 1943) supports good growth of *B. subtilis* with the production of good yields of antibiotic activity against a number of pathogenic organisms (in vitro) including *Bacillus anthracis*, *Diplococcus pneumoniae*, *Neisseria gonorrhoeae*, and *Mycobacterium tuberculosis* (A. J. Salle and G. J. Jann, Proc. Soc. Expt. Biol. and Med., vol. 60, p. 60, 1945).

This invention is particularly concerned with methods for the extraction and purification of subtilin produced by either surface or submerged culture on a suitable medium, such as asparagus juice, molasses, or the like. The active factor has been concentrated to 200 to 300 fold (dry weight basis) from the bacterial cultures. The purified product is a dull white powder which is soluble in acidified water.

It is an object of this invention to provide a process for preparing subtilin in purified form.

Other objects and advantanges of this invention will be apparent to those skilled in the art from the following description.

We have found that a purified form of subtilin may be obtained by a process involving the following steps:

1. Extraction of the material containing subtilin (a culture of a subtilin-producing strain of *B. subtilis* for example) with aqueous alcohol followed by evaporation of the extract to precipitate the subtilin fraction. In this step the alcohol may be any low-molecular, water-miscible alcohol such as methyl alcohol, ethyl alcohol, isopropyl alcohol, tertiary butyl alcohol, etc. The concentration of alcohol (with respect to water) may be from about 50% to about 90% and preferably is from about 65% to 75%. During the evaporation it is preferable to maintain an acidic condition to prevent decomposition of the subtilin. To this end, a small amount, about 0.25% to about 1.25% of an acid is added. An inorganic acid, such as hydrochloric, sulphuric, phosphoric, etc. may be used but it is preferable to employ an organic acid such as acetic acid. The evaporation of the extract to remove alcohol is preferably done under vacuum to prevent decomposition of the subtilin.

2. Removing undesired components from the subtilin-containing precipitate of step 1 by washing with aqueous ethanol having a concentration of about 90% to 100%, preferably about 95%. In this step the undissolved material is retained, the liquid material discarded.

3. Washing the precipitate of step 2 with aqueous ethanol of about 85% concentration containing a very low concentration (about 1%) of acetic acid and a very low concentration (about 1%) of an inorganic salt, such as sodium chloride, potassium chloride, ammonium chloride, sodium sulphate, etc. In this step the undissolved material is retained, the liquid discarded.

4. Extracting the partly purified material from step 3 with a buffer solution at a pH from about 4 to about 6, preferably about 4.6 to 4.7. The preferred buffer solution is aqueous acetic which has been adjusted to a pH of 4.6 to 4.7 by the addition of a base (sodium hydroxide, potassium hydroxide, ammonium hydroxide, etc.).

5. The extract from step 4 is then evaporated to obtain the subtilin in dry form. Preferably the extract is first freed from ions by passing it through beds of cation exchange materials and anion exchange materials. Since subtilin is not completely stable thermally, it is best to perform concentrations in vacuo and to dry by lyophilization.

The following examples disclose particular steps and conditions within the scope of this invention, but it is to be understood that these examples are given only by way of illustration and not limitation.

Cultures containing subtilin were prepared by surface culturing a strain of *Bacillus subtilis* on asparagus juice medium. The surface pellicle used as the raw material for purification was harvested by straining through cheesecloth. The harvested pellicle consisting of bacterial cells and residual medium contained about 10% solids on a volume basis.

In the following examples, subtilin was assayed by a short incubation period turbidimetric bacteriostatic method similar to that described by McMahan (Jour. Biol. Chem., vol. 153, p. 249, 1944) for penicillin. Test organisms included *Micrococcus conglomeratus*, *Staphylococcus aureus*, and *Streptococcus faecalis*. The values of subtilin contents are relative and are based on a selected sample of partially purified subtilin, the potency of which was arbitrarily designated as 100%. Thus a reference to a subtilin content of 12.4 equivalent grams means that the sample of material irrespective of its weight contains an amount of active material equivalent to 12.4 grams of the standard material. Since the products produced according to this invention are purer than the arbitrary standard, the equivalent subtilin content of many samples is greater than the actual weight of the material obtained. In such cases the relative purity will naturally be above 100%.

Samples of pellicle from different cultures were subjected to a preliminary purification using the following technique:

EXAMPLE 1

PRELIMINARY PURIFICATION (a) *Extraction with 65-70% ethanol*

Ten liters of pellicle was stirred with sufficient 95% ethanol (about 20 liters) to bring the alcohol concentration to 65-70%. The suspension was allowed to stand overnight in a cold room (4° C.) and the clear liquid decanted. The remainder of the liquid was separated from the cellular debris by filtration (centrifugation may also be used for this separation). The combined liquid extracts contained substantially all the subtilin previously contained in the pellicle. This extract contained 322 grams of solid material of which 124 equivalent grams was subtilin; i. e., a relative purity of 38.5%.

(b) *Concentration of aqueous ethanol extract*

The ethanol extract was acidified by the addition of 1% glacial acetic acid and concentrated in vacuo at about 35° C. to approximately 20% of the original volume. The concentrate was stored at 4° C. for 12-15 hours to allow the precipitate to flocculate and then centrifuged. The precipitate was washed with water and lyophilized to yield 36.8 grams of a dark brown, finely divided powder containing 12.4 equivalent grams of subtilin; i. e., a relative purity of 33.7%.

(c) *Washing with 95% ethanol*

The dried material from step b was extracted with 95% ethanol four times using 15 ml. of ethanol per gram of solids for each extraction. The insoluble material was collected after each extraction by centrifugation and finally lyophilized. A yield of 14.6 grams of solid material was obtained containing 12.0 equivalent grams of subtilin; i. e., a relative purity of 82%.

EXAMPLE 2

PRELIMINARY PURIFICATION

Two samples of subtilin pellicle were subjected to the purification procedure set forth in Example 1. The following results were obtained.

Table A

|  | Preparation number | |
| --- | --- | --- |
|  | SP2F | SP6A |
| (a) After extraction with 65-70% ethanol: | | |
| Dry wt., grams | 289 | 145 |
| Subtilin, equivalent grams | 4.58 | 7.12 |
| (b) After concentration of aqueous ethanol extract: | | |
| Dry wt., grams | 27.4 | 37.6 |
| Subtilin, equivalent grams | 4.56 | 5.45 |
| Relative purity, per cent | 16.6 | 14.5 |
| (c) After extraction with 95% ethanol: | | |
| Dry wt., grams | 5.62 | 4.59 |
| Subtilin, equivalent grams | 4.0 | 5.12 |
| Relative purity, per cent | 71.2 | 112 |

EXAMPLE 3

FINAL PURIFICATION (a) *Washing with ethanol containing acetic acid and sodium chloride*

Twenty-five and five-tenths grams of material (equivalent subtilin content 19.3 grams) which had been purified according to the technique of Example 1 was extracted 4 times with 100 ml. portions of solvent per 5 grams of solids. The solvent was 85% ethanol containing 1% acetic acid and 1% sodium chloride. The insoluble material was collected by centrifugation. A yield of 18.2 grams of solid material was obtained containing 17.0 equivalent grams of subtilin; i. e., a relative purity of 93.4%.

(b) *Extraction with acetate buffer*

The material from step a was dissolved with stirring in 0.08 N aqueous acetic acid (35 ml. per gram material). The solution was then adjusted to pH 4.6-4.7 by careful addition of 1N KOH with stirring. The flocculent brown precipitate was separated by centrifugation and subjected to the same extraction 5 times. The precipitated material was then discarded and the liquid extract clarified by filtration in the presence of 0.03% of a refined diatomaceous earth filter aid.

The clear filtrate was freed from cations by passing it through an organic cation-exchange resin and subsequently the pH was brought to 3.2 by stirring with an organic anion-exchange resin. This procedure is necessary in order that the product be free from inorganic ions and particularly chloride ions. The extract was then concentrated to approximately one-fourth its volume in vacuo below 35° C. and then lyophilized. Ten grams of a dull white powder containing 18.6 equivalent grams of subtilin was obtained; i. e., relative purity of 186%.

EXAMPLE 4

FINAL PURIFICATION

Two samples of material which had been purified according to the technique set forth in Example 1 were given a further purification according to the procedure outlined in Example 3. The following results were obtained:

Table B

|  | Experiment No. | |
| --- | --- | --- |
|  | 86 | 87 |
| Starting material: | | |
| Dry wt., grams | 26.6 | 26.6 |
| Subtilin, equivalent grams | 21.0 | 21.0 |
| Relative purity, per cent | 79 | 79 |
| (a) After extraction with 85% ethanol, 1% acetic acid, and 1% NaCl: | | |
| Dry wt., grams | 18.9 | 17.8 |
| Subtilin, equivalent grams | 18.0 | 19.0 |
| Relative purity, per cent | 95.2 | 107 |
| (b) After fractionation with acetic acid: | | |
| Dry wt., grams | 8.4 | 7.8 |
| Subtilin, equivalent grams | 14.2 | 13.2 |
| Relative purity, per cent | 169 | 169 |

In the above examples lyophilization (i. e., drying in vacuum from the frozen state) was employed after several of the extractions. Such technique is preferable but not essential. Drying may also be accomplished by moderate heating under vacuum.

Having thus described our invention, we claim:

1. The method of preparing subtilin in purified form which comprises extracting a material containing subtilin with an aqueous alcohol, concentrating the extract to precipitate the subtilin fraction, washing the precipitate with aqueous ethanol of about 90% to 100% concentration, then with aqueous ethanol of about 85% concentration containing a very low concentration of acetic acid and an inorganic salt, then extracting the partly purified precipitate with a buffer solution at a pH from about 4 to about 6.

2. The method of preparing subtilin in purified form which comprises extracting a material containing subtilin with an aqueous alcohol, acidifying and concentrating the extract to precipitate the subtilin fraction, washing the precipitate with aqueous ethanol of about 90% to 100% concentration, then with aqueous ethanol of about 85% concentration containing a very low concentration of acetic acid and an inorganic salt, then extracting the partly purified precipitate with a buffer solution at a pH from about 4 to about 6.

3. The method of preparing subtilin in purified form which comprises extracting a material containing subtilin with aqueous ethanol, acidifying and concentrating the extract to precipitate the subtilin fraction, washing the precipitate with aqueous ethanol of about 90% to 100% concentration, then with aqueous ethanol of about 85% concentration containing a very low concentration of acetic acid and an inorganic salt, then extracting the partly purified precipitate with a buffer solution at a pH from about 4 to about 6.

4. The method of preparing subtilin in purified form which comprises extracting a material containing subtilin with 65% to 70% aqueous ethanol, acidifying, then concentrating the extract to precipitate the subtilin-containing fraction, removing undesired components from this precipitate by washing with 95% aqueous ethanol, then with 85% aqueous ethanol containing a very low concentration of acetic acid and sodium chloride, then extracting the partially purified precipitate with aqueous acetic acid which has been adjusted to a pH of 4.6 to 4.7 by the addition of alkali.

5. The method of preparing subtilin in purified form which comprises extracting a material containing subtilin with 65% to 70% ethanol, acidifying the extract with acetic acid and concentrating it to precipitate the subtilin-containing fraction, removing undesired components from this precipitate by washing with 95% ethanol, then with 85% ethanol containing about 1% acetic acid and about 1% sodium chloride, then extracting the partly purified precipitate with aqueous acetic acid which has been adjusted to a pH of 4.6 to 4.7 by the addition of alkali, removing ions from the extract and evaporating the solvents.

KEENE P. DIMICK.
GORDON ALDERTON.
JAMES C. LEWIS.
HOWARD D. LIGHTBODY.
HARRY L. FEVOLD.

REFERENCES CITED

The following references are of record in the file of this patent:

Jansen et al., Arch. Biochem., vol. 4, pages 297–309 (1944).

Salle, "The Nature, Properties, and Toxicity of Subtilin, and its Chemotherapeutic Effect on the Course of Experimental Infections in Animals." (Presented at the Conference of Antibiotic Research held at Washington, D. C., on Jan. 31, and Feb. 1, 1947, under the Auspices of the Antibiotics Study Section of the National Institute of Health, Bethesda, Md.), pages 1–2.